United States Patent [19]

Dei

[11] Patent Number: 5,263,135
[45] Date of Patent: Nov. 16, 1993

[54] IMAGE PROCESSING APPARATUS

[75] Inventor: Katsuhito Dei, Tokyo, Japan

[73] Assignee: Canon Kabushiki Kaisha, Tokyo, Japan

[21] Appl. No.: 418,921

[22] Filed: Oct. 6, 1989

Related U.S. Application Data

[63] Continuation of Ser. No. 226,515, Jul. 28, 1988, abandoned, which is a continuation of Ser. No. 886,390, Jul. 17, 1986, abandoned.

[30] Foreign Application Priority Data

Jul. 18, 1985 [JP] Japan .................................. 60-156880
Jul. 26, 1985 [JP] Japan .................................. 60-163854

[51] Int. Cl.$^5$ .................................................. G06F 15/66
[52] U.S. Cl. ........................ 395/163; 395/162; 395/137; 395/138; 395/139
[58] Field of Search .............. 364/518, 522; 358/287, 358/290; 340/724, 727; 395/133, 134, 135, 136, 137, 162, 163, 138, 139

[56] References Cited

U.S. PATENT DOCUMENTS

| | | | |
|---|---|---|---|
| 4,463,372 | 7/1984 | Bennett et al. | 358/22 |
| 4,520,399 | 5/1985 | Iida | 358/287 |
| 4,550,315 | 10/1985 | Bass et al. | 364/522 |
| 4,610,026 | 9/1986 | Tabata et al. | 382/47 |
| 4,618,991 | 10/1986 | Tabata et al. | 382/46 |
| 4,641,197 | 2/1987 | Miyagi | 358/280 |
| 4,672,680 | 6/1987 | Middleton | 382/44 |
| 4,701,808 | 10/1987 | Nagashima | 358/287 |
| 4,797,809 | 1/1989 | Sato et al. | 364/200 |
| 4,797,852 | 1/1989 | Nanda | 364/900 |
| 4,829,452 | 5/1989 | Kang et al. | 364/518 |
| 4,894,646 | 1/1990 | Ryman | 340/747 |
| 4,951,231 | 8/1990 | Dickinson et al. | 364/521 |
| 5,027,287 | 6/1991 | Antigalas et al. | 364/518 |

Primary Examiner—Phu K. Nguyen
Attorney, Agent, or Firm—Fitzpatrick, Cella, Harper & Scinto

[57] ABSTRACT

An image processing apparatus in which a digital image data can be moved, rotated, enlarged/reduced with a variable magnification, and the like. This apparatus includes a generator to generate image data of at least one picture plane; a first memory to store the image data of a part of the picture plane; a processor for performing a coordinate converting process for the image data stored in the first memory; a second memory to store the result of the converting process by the processor; and a controller to control the storing operation by the first memory, the processing operation by the processor, and the storing operation by the second memory so as to repeatedly execute these operations a plurality of times. The processor rotates the image data and has a first calculating unit to calculate the rotation of the image data in the first memory and a second calculating unit to calculate an amount of parallel movement of the partial image data in association with the rotation of the image data. With this apparatus, e.g., the raster input image data can be real-time processed at a high speed by hardware consisting of a memory of a small capacity, a few multipliers, etc.

16 Claims, 9 Drawing Sheets

FIG. I

IMAGE PROCESSING APPARATUS

This application is a continuation of Parent application Ser. No. 226,515 filed Jul. 28, 1989, now abandoned, which is a continuation of application Ser. No. 886,390, filed Jul. 17, 1986, now abandoned.

BACKGROUND OF THE INVENTION

1. Field of the Invention

The present invention relates to an image processing apparatus and, more particularly, to an image processing apparatus which makes it possible to execute the processes such as movement, enlargement/reduction with a variable magnification, rotation, and the like of digital image information.

2. Related Background Art

Hitherto, the affine transformation has been known as a method for accomplishing the rotation and the like of an image; Expression (1) is a general expression of the two-dimensional affine transformation. Assuming that the coordinates of an arbitrary point of the original image are $(S_x, S_y)$ and the coordinates after the transformation of the corresponding point are $(D_x, D_y)$, expression (1) can be expressed as follows.

$$[D_x \, D_y \, 1] = [S_x \, S_y \, 1] \cdot \begin{bmatrix} a & b & 0 \\ c & d & 0 \\ t_x & t_y & 1 \end{bmatrix} \quad (1)$$

The second term on the right side of expression (1) is the transformation matrix. In the case of rotating by only an angle $\theta$ around an arbitrary point $(P_x, P_y)$, the transformation matrix can be described as follows.

$$\begin{bmatrix} (\cos \theta) & (\sin \theta) & 0 \\ (-\sin \theta) & (\cos \theta) & 0 \\ (P_x(1 - \cos \theta) + P_y \cdot \sin \theta) & (-P_x \cdot \sin \theta + P_y(1 - \cos \theta)) & 1 \end{bmatrix} \quad (2)$$

An image can be also moved and enlarged or reduced with a variable magnification using expression (1).

For example, when the original image is increased n times and moved by the distance $t_x$ in the direction of the x axis and by the distance $t_y$ in the direction of the y axis, the matrix of the second term of the right side of expression (1) will become $$\begin{pmatrix} n & 0 & 0 \\ 0 & n & 0 \\ t_x & t_y & 1 \end{pmatrix} \quad (3)$$

The above method is well known and can be realized by some software or hardware. However, to process the affine transformation at a high speed, it is necessary to realize the above method by hardware. At the same time, the memory to store the image before and after the conversion must be the real memory. This is because it takes a time to input and output the image data before and after the conversion, so that the capability of the hardware to realize expression (1) cannot be effectively used. Therefore, in the conventional image processing apparatus in which the affine transformation is realized by hardware, the processing region is up to about 512×512 dots which can be realized by a real memory. Further, random access memories of a full page need to be arranged at the stages before and after the conversion, so that two memories each consisting of 512×512 dots are necessary. Thus, there is the drawback such that the cost increases. Moreover, as will be obvious from expression (1), there is also the drawback such that six high speed multipliers are needed to obtain $(D_x, D_y)$.

SUMMARY OF THE INVENTION

It is an object of the present invention to provide an image processing apparatus which can solve the drawbacks of the conventional technology as mentioned above.

Another object of the invention is to provide an image processing apparatus which can perform the processes such as enlargement/reduction with a variable magnification, parallel movement, rotation, and the like of an image by use of a memory having a small capacity.

Still another object of the invention is to provide a novel image processing apparatus in which image conversion of an arbitrary size can be realized by a real memory having a small capacity and a small number of multipliers.

Still another object of the invention is to provide an image data processing apparatus which can perform the real-time processes such as enlargement, reduction, parallel movement, rotation, and the like of an image for a raster input image having an arbitrary size which is time sequentially input.

The above and other objects and features of the present invention will become apparent from the following detailed description and the appended claims with reference to the accompanying drawings.

DETAILED DESCRIPTION OF THE PREFERRED EMBODIMENTS

Outlines of Arrangement and Operation of the First Embodiment.

Figure 1:
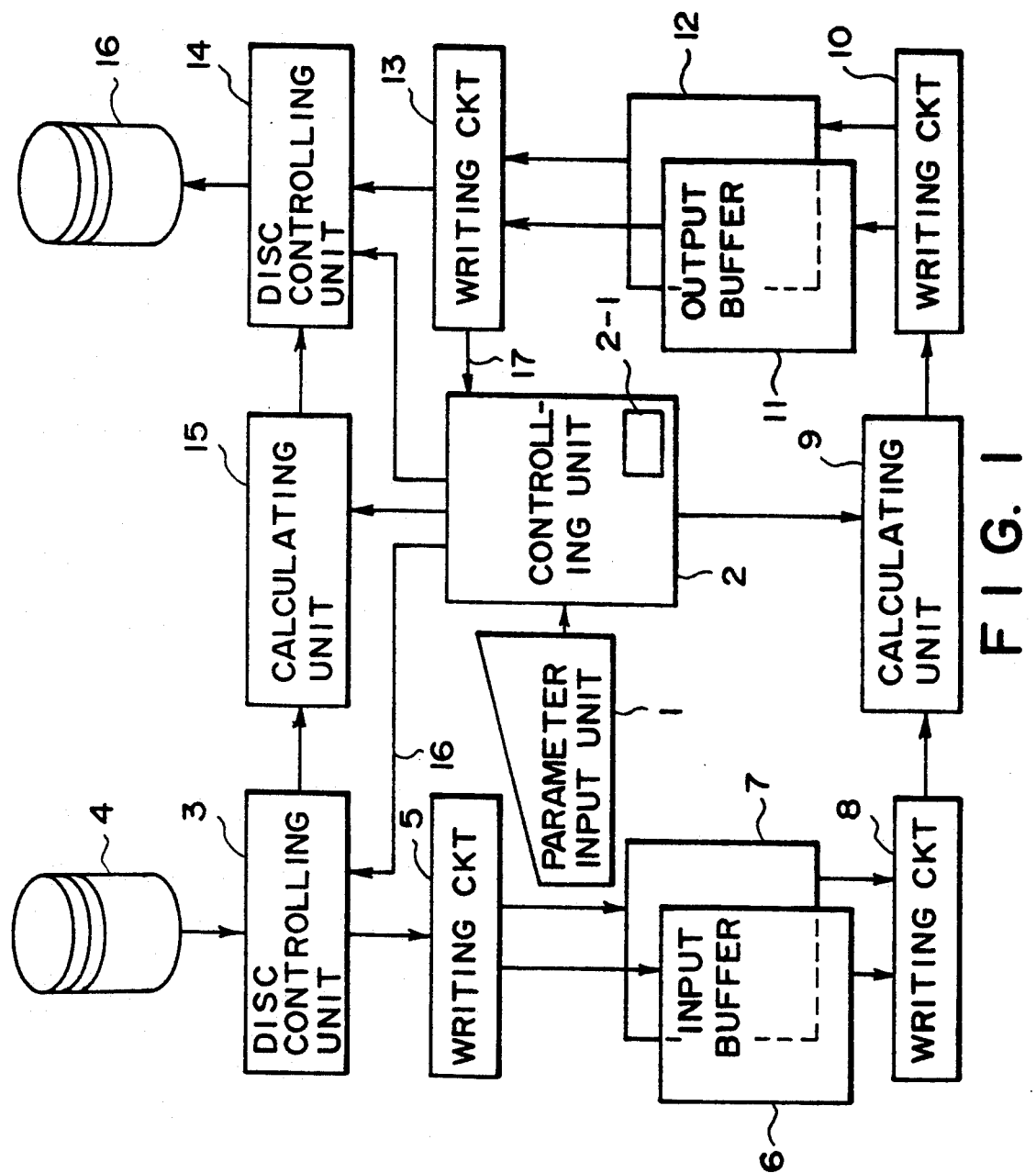
FIG. 1 is a block diagram of an image processing apparatus of the first embodiment of the present invention.

An image processing apparatus of the first embodiment shown in FIG. 1 comprises: discs 4 and 16 for storing image data; a parameter input unit 1 for inputting rotation information; input buffers 6 and 7 serving as a first memory unit; an image rotation calculating unit 9 serving as a first calculating unit to calculate the rotation; output buffers 11 and 12 serving as a second memory unit; a parallel movement amount calculating unit 15 serving as a second calculating unit; and a controlling unit 2.

In such an arrangement of FIG. 1 the image data recorded in the disc 4 is read out on a certain block unit basis and sequentially set into the input buffers 6 and 7. The reading operation of the block is performed in a manner such that a predetermined amount overlaps in both of the main scanning and sub-scanning directions. Each pixel data of the image data in the input buffers 6 and 7 is subjected to a rotating process by the image rotation calculating unit 9 in accordance with a parameter input from the parameter input unit 1, and the resultant data is stored into the output buffers 11 and 12. On the other hand, the coordinates of the center of the block are calculated by the parallel movement amount calculating unit 15 in accordance with the foregoing parameter. The image data in the output buffers 11 and 12 is written into the block of the disc 16 of which the calculated values become coordinates of the center.

Figure 2:
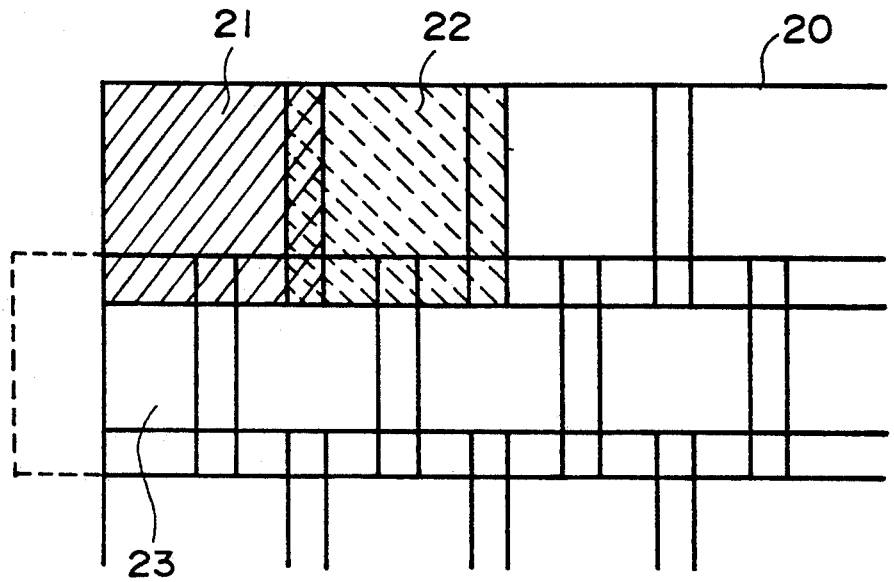
FIG. 2 is a diagram showing an example of a reading block of image data.
Figure 3:
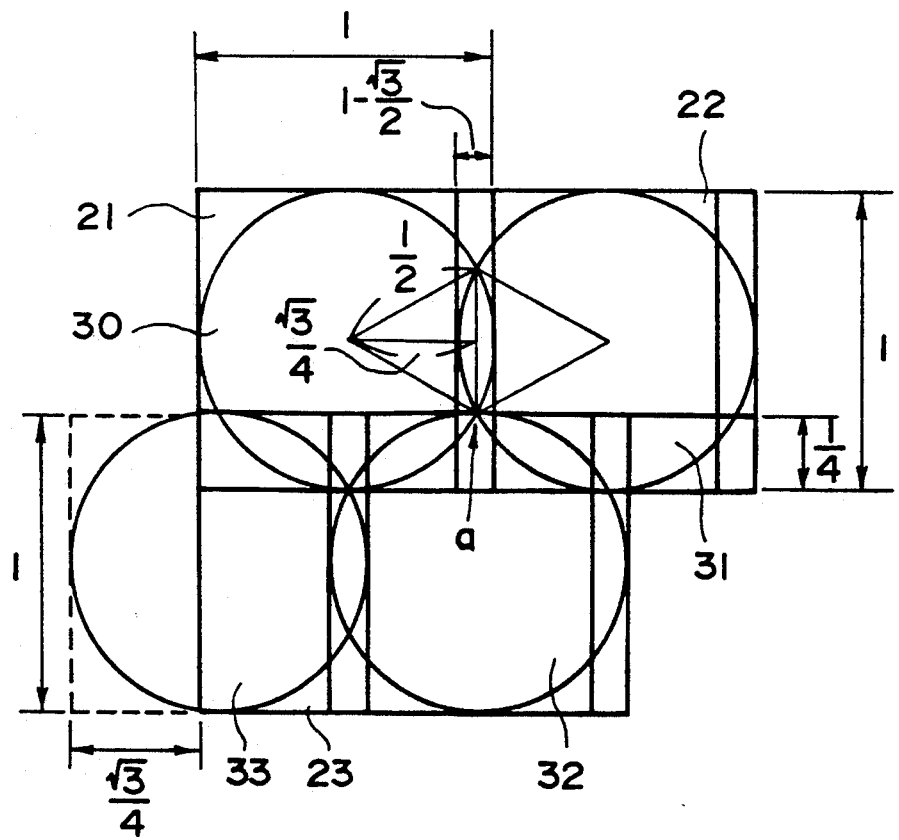
FIG. 3 is a diagram for explaining a multiplicity of the reading blocks.

Description of Whole Block Diagram and Operation of the Apparatus of the First Embodiment (FIGS. 1 to 3).

FIG. 1 is a block diagram of the image processing apparatus of the first embodiment. Reference numeral 1 denotes the parameter input unit to input the coordinates of a rotational center and an angle of rotation. The controlling unit controls the whole apparatus and is constituted by, e.g., a microprocessor or the like. Control programs are stored in a ROM 2-1.

Numeral 3 denotes a disc controlling unit for reading out the original image from the disc device 4; 4 is the disc device in which the original image is recorded; 5 a writing circuit for alternately writing data into the two input buffer memories 6 and 7; 6 and 7, the first and second input buffers, having the same capacity; 8 denotes a reading circuit for alternately reading the data from the two input buffer memories 6 and 7; 9 denotes the image rotation calculating unit for rotating an image in accordance with the angle of rotation given from the parameter input unit 1; 10 denotes a writing circuit for alternately writing data into the two output buffer memories 11 and 12; 11 and 12, the first and second output buffers, having the same capacity; and 13 denotes a reading circuit for alternately reading the data from the two output buffer memories 11 and 12. Numeral 14 represents a disc controlling unit for writing the rotated image into the disc device 16; 16 is the disc device for recording the rotated image; and 15 is the calculating unit for calculating an amount of parallel movement which is determined by the parameter input unit 1.

FIG. 2 shows a map of the original image stored in the disc device 4. Numeral 20 denotes an original image map and 21 is a first block which is first read out of the original image.

First, when the coordinates $(P_x, P_y)$ of the rotational center and the rotation angle θ are input from the parameter input unit 1, the controlling unit 2 instructs the disc controlling unit 3 to read out the first block 21 of the first original image. The parallel movement amount calculating unit 15 calculates the parallel movement component of the central portion of the block 21 from the coordinates $(P_x, P_y)$ of the rotational center and the rotational angle θ in accordance with the following expressions (4):

$$B_x = P_x \cdot (1 - \cos\theta) + P_y \cdot \sin\theta \\ B_y = -P_x \cdot \sin\theta + P_y \cdot (1 - \cos\theta) \quad (4)$$

$(B_x, B_y)$ denote the coordinates of the central portion due to the rotating operation of the image and indicate the center of the block when the image block read out of the disc device 4 is stored in the disc device 16.

On the other hand, the first block, of the original image read out of he disc device 4 by the disc controlling unit 3 is written into the first input buffer 6 by the writing circuit 5. After completion of the writing, the contents of the first input buffer 6 is transferred to the image rotation calculating unit 9 by the reading circuit 8. The image rotation calculating unit 9 rotates all of the content of the input buffer 6 around the center of the input buffer 6 as an origin on the basis of the rotations angle θ supplied from the parameter input unit 1 in accordance with the following expressions (5).

$$D_x = S_x \cdot \cos\theta - S_y \cdot \sin\theta \\ D_y = S_x \cdot \sin\theta + S_y \cdot \cos\theta \quad (5)$$

After completion of the calculations, the calculating unit 9 writes the results of the calculations into the first output buffer 11 through the writing circuit 10. After completion of the writing, the content of the first output buffer 11 is read out by the reading circuit 13 and transmitted to the disc controlling unit 14. The disc controlling unit 14 writes the content of the first output buffer 11 into the block of the disc device 16 of which the coordinates $(B_x, B_y)$ calculated by the parallel movement amount calculating unit 15 become the center in response to an instruction from the controlling unit 2.

After the disc controlling unit 3 reads out the first block 21 of the original image, it starts reading out a second block 22 so as to overlap the first block 21 by an amount of $(1 - \sqrt{3}/2)$ block in the X direction. The content of the second block 22 is written into the second input buffer 7 by the writing circuit 5. After the reading circuit 8 reads out the content of the first input buffer 6, it starts reading out the content of the second input buffer 7. The content read out of the second input buffer 7 is rotated and thereafter it is written into the second output buffer 12 by the image rotation calculating unit 9 and writing circuit 10.

The content of the second output buffer 12 is also read out by the reading circuit 13 and transmitted to the disc controlling unit 14 and written into the disc device 16 in response to an output of the parallel movement amount calculating unit 15. The reading circuits 8 and 13 and the writing circuits 5 and 10 operate synchronously with each other. The first and second input buffers 6 and 7 are alternately used. The first and second output buffers 11 and 12 are alternately used. It should be noted that the first input buffer 6 and the first output buffer 11 are used as a pair, and the second input buffer 7 and the second output buffer 12 are also used as a pair.

After completion of the reading of all of the continuous blocks in the X direction, the disc controlling unit 3 shifts the start point to read out the original image by $(-\sqrt{\frac{1}{2}})$ block in the X direction and by $(\frac{3}{2})$ block in the Y direction and sequentially reads out the original image from the shifted point as a start point in a manner such that $(1 - \sqrt{3/2})$ block overlaps.

FIG. 3 is a diagram for explaining the amount of overlap. A length of one side of each block is set to 1. A circle 32 having a radius of ½ is drawn so as to pass through an intersection point a of a circle 30 having a radius of ½ which is inscribed in the block 21 and a circle 31 having a radius of ½ which is inscribed in the block 22. It will be understood in this case that there is no gap among the three circles 30, 31, and 32 and that the overlap amount of each circle is $(1 - \sqrt{3/2})$ in the X direction and (¼) in the Y direction. Since the position of the center of a circle 33 deviates from the position of the center of the circle 30 by $(\sqrt{\frac{3}{4}})$ to the left, it will be easily understood that the start position of a block 23 also deviates by $(-\sqrt{\frac{3}{4}})$ block in the X direction.

Figure 4:
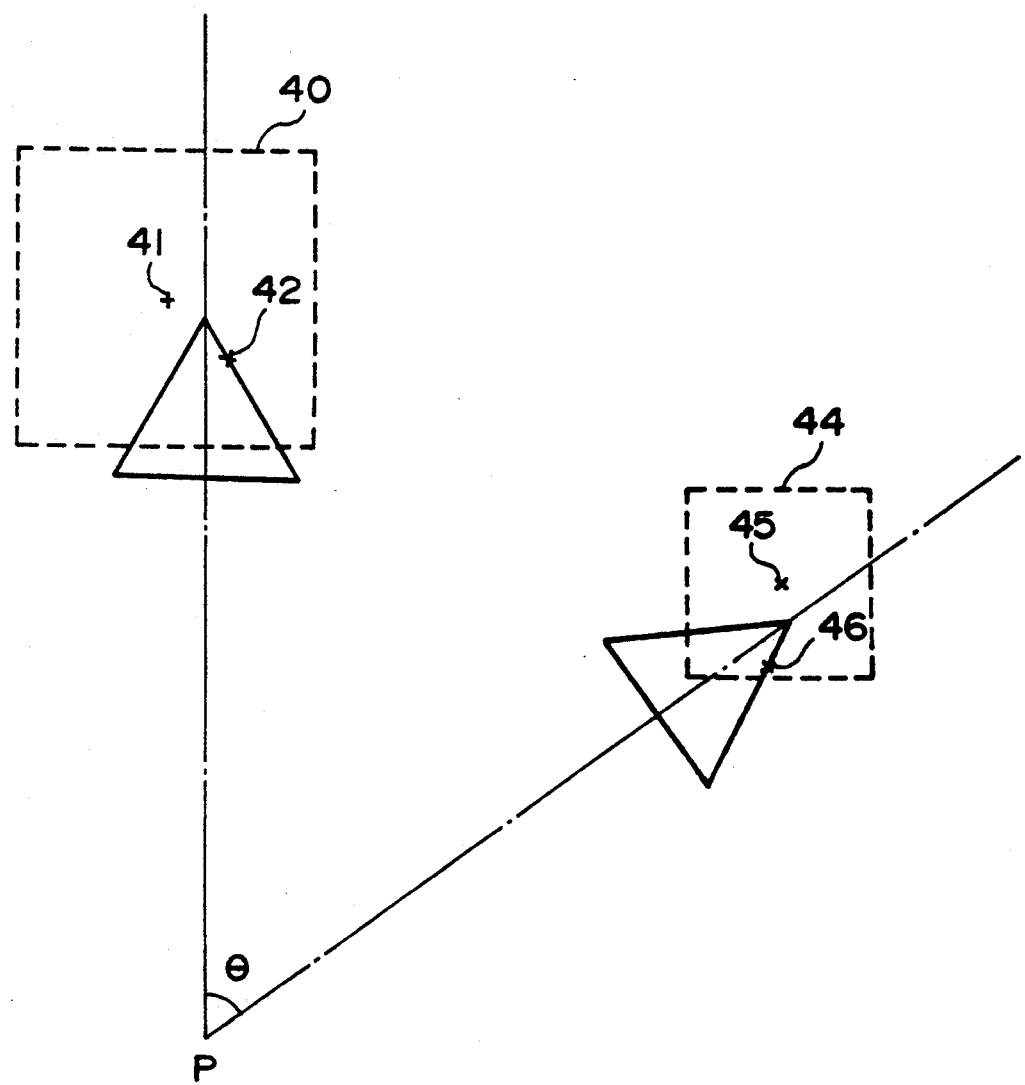
FIG. 4 is a diagram showing an example of the rotation of an image.

Explanation of Image Rotation (FIG. 4)

FIG. 4 is a diagram for explaining a situation of the image rotation in this embodiment. Reference numeral 40 denotes a block to be currently processed, 41 indicates a center of the block 40, and 42 represents an arbitrary point included in the block 40. P is a point of the rotational center; 44 is a block after the rotation; 45 a central point of the block 44; and 46 an arbitrary point in the block 44. The transformation to rotate the image of the block 40 by only the angle $\theta$ around the point P as a rotational center can be expressed as follows as shown in expression (2).

$$\begin{bmatrix} (\cos \theta) & (\sin \theta) & 1 \\ (-\sin \theta) & (\cos \theta) & 1 \\ (P_x(1 - \cos \theta) + & (-P_x \cdot \sin \theta + & 0 \\ P_y \cdot \sin \theta) & P_y(1 - \cos \theta)) & \end{bmatrix}$$

This transformation is constituted by the rotating process for storing the block 40 in the input buffer and rotating by the angle $\theta$ around the center of the buffer as an origin as shown by the following expression $$\begin{bmatrix} \cos \theta & \sin \theta & 1 \\ -\sin \theta & \cos \theta & 1 \\ 0 & 0 & 0 \end{bmatrix}$$

and the process for subsequently writing the block in the location which was moved in parallel as shown by the following expression.

$$\begin{bmatrix} 1 & 0 & 1 \\ 0 & 1 & 1 \\ (P_x(1 - \cos \theta) + & (-P_x \cdot \sin \theta + & 0 \\ P_y \cdot \sin \theta) & P_y(1 - \cos \theta)) & \end{bmatrix}$$

In the case of performing the rotating process, if the input buffer and output buffer have the same capacity, in the case where the rotation angle is, e.g., 45°, the image will lack near the edge of the output buffer. Therefore, the size of the input buffer must be larger than the size of the output buffer by $\sqrt{2}$ or more times as a ratio of one side. Further, since the input buffer is larger in size than the output buffer, the original image needs to be overlappingly read out and written into the input buffer as mentioned above.

Figure 5:
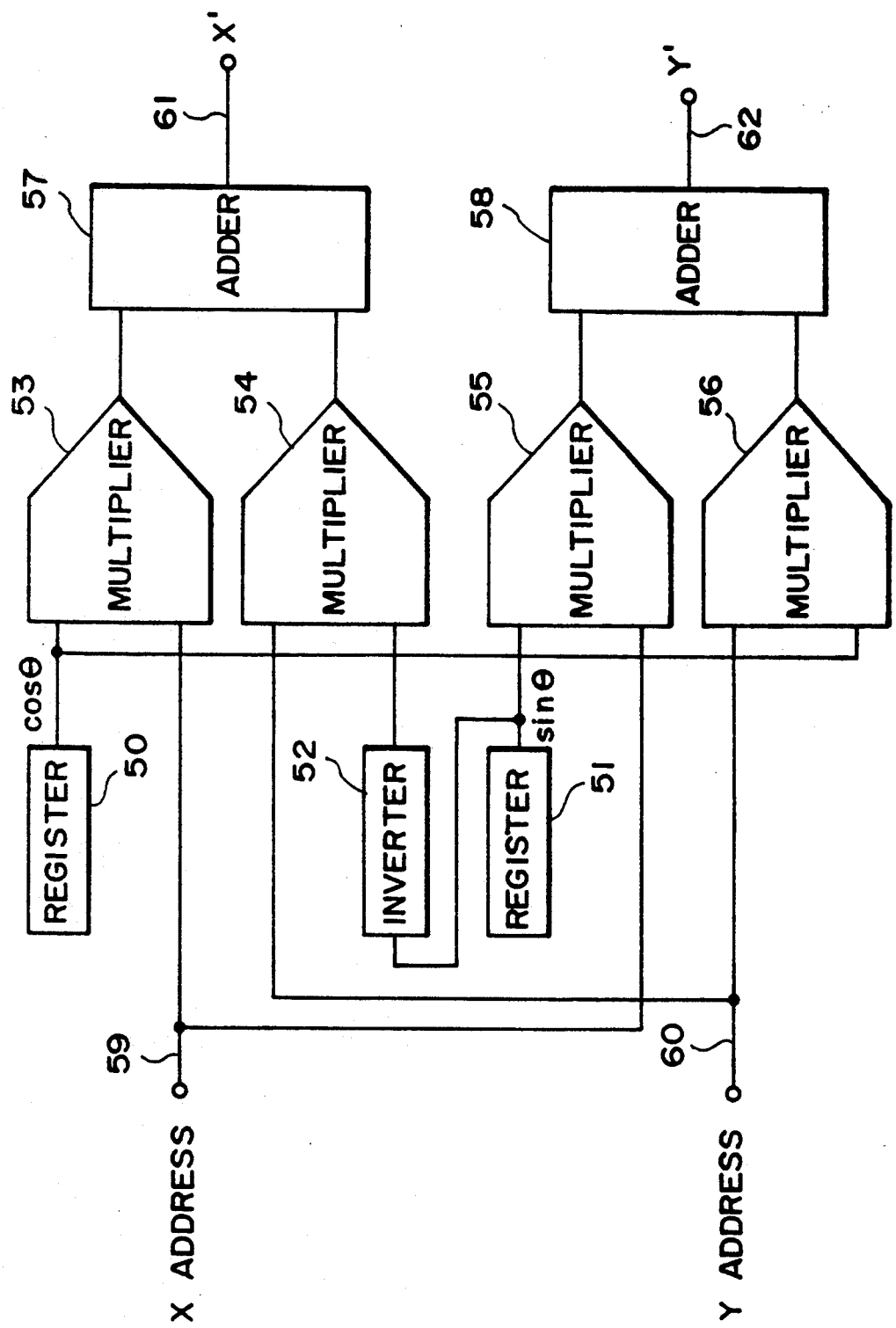
FIG. 5 is a block diagram of an image rotation calculating unit.

Explanation of Image Rotation Calculating Unit (FIG. 5)

FIG. 5 shows an example of an arrangement of the image rotation calculating unit 9 shown in FIG. 1. Numerals 50 and 51 denote registers for storing coefficients; 52 is an inverter for converting a positive number to a negative number; 53 to 56 denote multipliers; and 57 and 58 denote adders.

First, in accordance with the rotation angle $\theta$ derived from the parameter input unit 1, the values of $\cos \theta$ and $\sin \theta$ are written into the registers 50 and 51, respectively. It is now assumed that the values of $\cos \theta$ and $\sin \theta$ have been preliminarily stored in the ROM 2-1 in the controlling unit 2.

Numeral 59 denotes an input line of the X address of the image before the conversion. For the X address supplied from the input line 59, X $\cos \theta$ and X $\sin \theta$ are calculated by the multipliers 53 and 55. For the Y address supplied from an input line 60, $-$Y $\sin \theta$ and Y $\cos \theta$ are similarly calculated by the multipliers 54 and 56. Thereafter, $$X' = X \cos \theta - Y \sin \theta$$

is calculated by the multiplier 57 and output to an output line 61, and $$Y' = X \sin \theta + Y \cos \theta$$

is calculated by the multiplier 58 and output to an output line 62. Thus, the address after the rotation is obtained.

Figure 6:
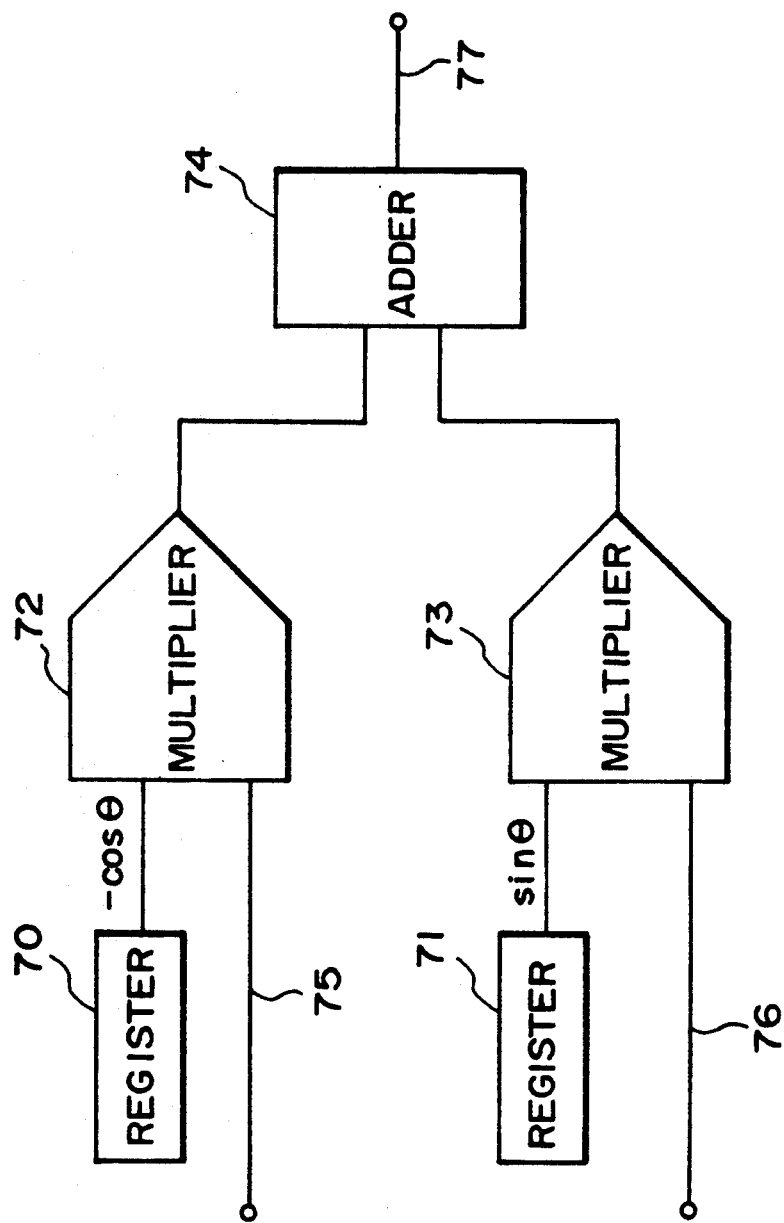
FIG. 6 is a block diagram of a parallel movement amount calculating unit.

Parallel Movement Amount Calculating Unit (FIG. 6)

The parellel movement amount calculating unit 15 may be constituted by software since it is sufficient to calculate once for one block. However, the calculating unit 15 may be realized by hardware consisting of, e.g., two multipliers 72 and 73 and one adder 74 as shown in FIG. 6. In this case, by setting $-\cos \theta$ into a register 70 and $\sin \theta$ into a register 71, $(-X \cos \theta + Y \cos \theta)$ is output to an output line 77. Therefore, by adding X to this output value, $B_x$ of the central coordinates $(B_x, B_y)$ after the parallel movement can be obtained. Similarly, by setting $-\sin \theta$ into the register 70 and $-\cos \theta$ into the register 71, $(-X \sin \theta - Y \cos \theta)$ is output to the output line 77. By adding Y to this output value, $B_y$ is derived. The parallel movement amount calculating unit 15 is not limited to such an arrangement as shown in FIG. 6 but may be also obviously constituted so as to calculate expression (3) all together.

Figure 7:
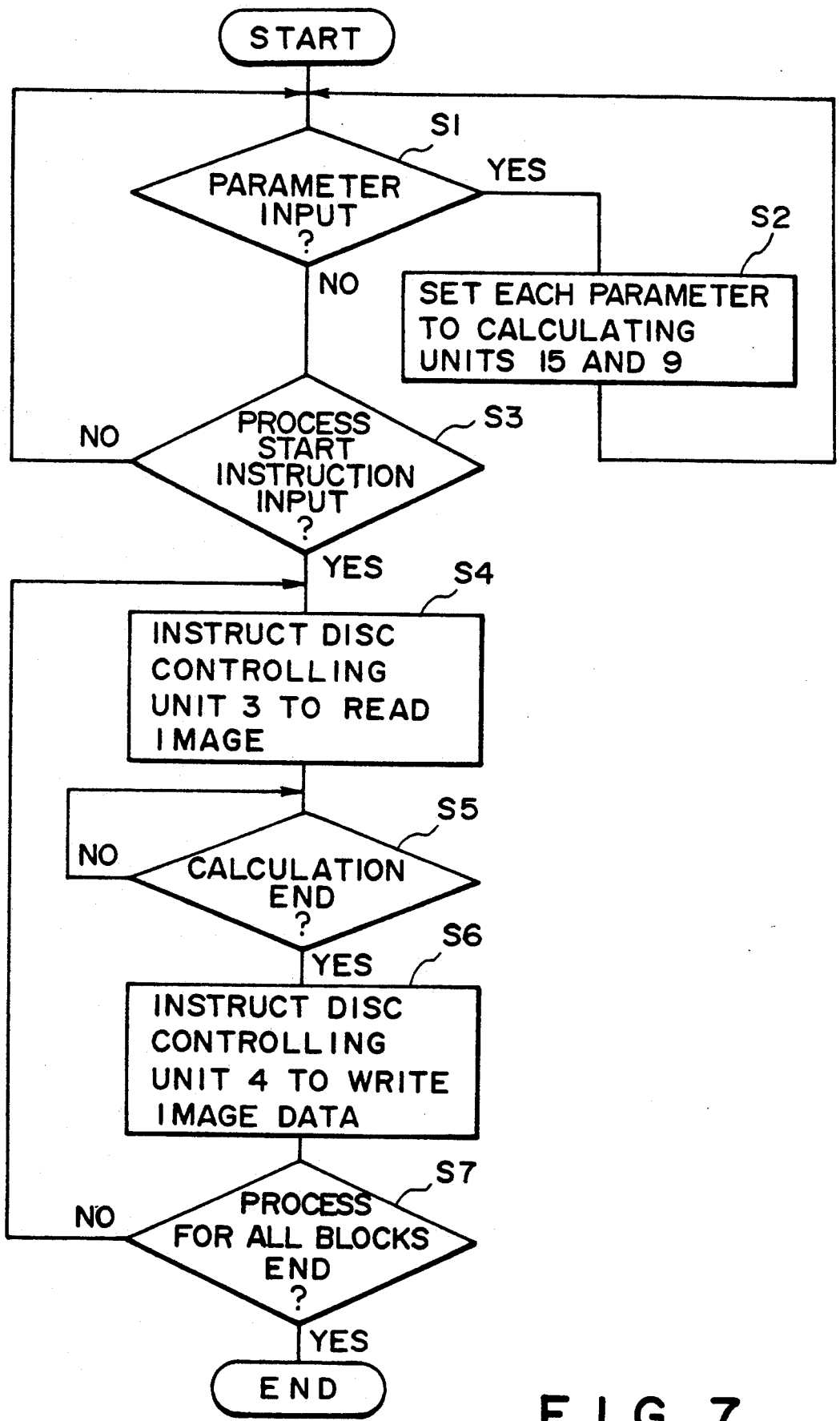
FIG. 7 is a flowchart showing the rotation processing operation of, image data of a controlling unit.

Explanation of Operation Flowchart of Control Unit (FIGS. 1 and 7)

FIG. 7 shows an operation flowchart for the image rotating process stored in the ROM 2-1 in the controlling unit 2.

First, a check is made to see if the rotation angle $\theta$ and the position $(P_x, P_y)$ of the rotation central coordinates have been input from the parameter input unit 1 or not in step S1. If YES in step S1, step S2 follows. In step S2, the respective input parameters and the values of $\cos \theta$ and $\sin \theta$ based on the angle $\theta$, and the like are set in the calculating units 15 and 9.

If NO in step S1, step S3 follows and a check is made to see if an image process start instruction has been input or not. If YES in step S3, the disc controlling unit 3 is instructed to read out the image data of one block from the disc 4 through a signal line 18 in step S4. Thus, the writing circuits 5 and 10 and the reading circuits 8 and 13 operate synchronously with each other. The rotation of the image is calculated by way of the input buffers 6 and 7 and the results of the calculations are stored in the output buffers 11 and 12.

When the controlling unit 2 detects the end of calculations on the basis of a signal 17 from the reading circuit 13 (step S5), it instructs the disc controlling unit 14 to write the image signal in step S6, thereby writing the image data into the block of the disc 16 of which the position calculated by the calculating unit 15 is the center. In step S7, a check is made to see if all blocks of the image data in the disc 4 have been processed or not. If YES in step S7, the processing routine ends. If not, the processing routine is returned to step S4 and the foregoing operations will be repeatedly executed.

On the other hand, the output of the image rotation calculating unit 9 is not limited to an integer value in the embodiment. Therefore, it will not depart from the spirit of the present invention to provide means for correcting data due to the well-known linear interpolation or cubic interpolation as well.

In the case of interpolating the data, the address calculations of nine points after the rotation need to be executed, e.g., in the cubic interpolation. However, it is sufficient to read out the data of nine points in the input buffer and perform the interpolating process by constituting the image rotation calculating unit 9 so as to perform the inverse conversion and obtaining the input buffer address such as $$[S_x \ S_y] = [D_x \ D_y] \cdot \begin{bmatrix} \cos \theta & -\sin \theta \\ \sin \theta & \cos \theta \end{bmatrix}$$

on the basis of the output buffer address. In this case, the interpolating process can be efficiently performed.

In this embodiment, two sets of input and output buffers have been provided for the high speed transformation and their contents have been interleaved respectively. However, this constitution is not a necessary condition of this embodiment.

On the other hand, in this embodiment, if 1 and 0 are set in the registers 50 and 51 in the image rotation calculating unit 9, the image can be also moved in parallel without changing the constitution nor adding some circuits to this constitution.

As described above, according to the embodiment, it is sufficient that the input data is divided into blocks and the address after the rotation of the central point of the block is obtained and the result of the rotating process is obtained on a block unit basis using the center of the block as an origin. Therefore, the following effects and the like are obtained.

1. It is sufficient for the parallel movement amount calculating unit 15 to perform the calculation once for each block; therefore, there is no need to use expensive high speed multipliers.

2. In the calculation of the image rotation, the center of the block can be set to the origin, so that the constitution is simplified.

3. All of the addresses of the points derived due to the rotation are stored in the respective input and output buffers together with the input and output addresses. Therefore, no problem occurs in the interfaces among the input and output buffers and the external memories and the arithmetic operations can be performed at a high speed.

4. Since the conversion is carried out for every block, there is no need to provide a real memory of the whole image region.

5. The image can be also moved in parallel by the same constitution.

Outlines of Arrangement and Operation of the Second Embodiment

Figure 8:
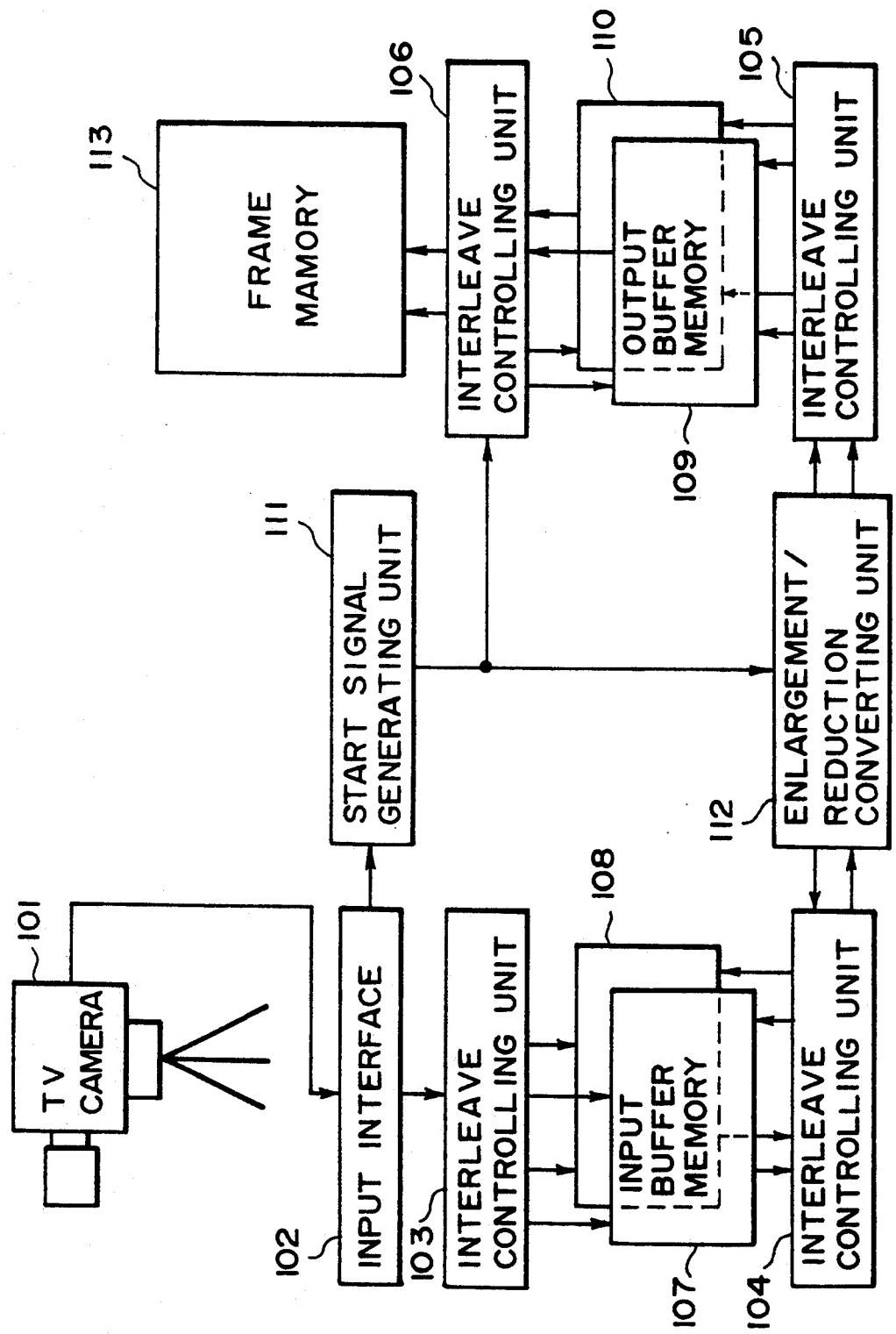
FIG. 8 is a block diagram of an image processing apparatus of the second embodiment of the invention.

An image processing apparatus of the second embodiment shown in FIG. 8 comprises: an input interface for inputting, e.g., a raster input image; an input buffer memory for temporarily storing the input raster data; an enlargement/reduction converting unit; an output buffer memory for temporarily storing the converted data; and an external output memory (frame memory).

In such an arrangement of FIG. 8, a few lines of the raster data which was input from, e.g., a TV camera or the like is stored in the input buffer memory. The raster data stored in the input buffer memory is sequentially subjected to a converting process such as enlargement, reduction, or the like. The converted data is stored in the output buffer memory. The data stored in the output buffer memory is output to the external output memory (frame memory).

Detailed Explanation of the Second Embodiment

The second embodiment of the present invention will now be described in detail hereinbelow with reference to the accompanying drawings.

FIG. 8 is a block diagram of the second embodiment of the invention. An explanation will be made with respect to the case where, for example, the raster image signal input from the TV camera is analog-to-digital converted and the resultant digital signal is enlarged or reduced and then moved in parallel and thereafter it is written into the frame memory.

The input apparatus is not limited to a TV camera nor to a raster input apparatus. The output apparatus is not limited to a frame memory as well.

Reference numeral 101 denotes a TV camera as an input apparatus; 102 is an input interface having an A/D converter, a vertical sync signal separating circuit, a horizontal sync signal separating circuit, and the like; 103 to 106 denote interleave controlling units each for switching two buffer memories; 107 and 108 denote input buffer memories each having a small capacity; 109 and 110 denote output buffer memories each having small capacity; 111 denote a start signal generating unit for making an enlargement/reduction converting unit 112 operative, 112 denoting the enlargement/reduction converting unit for performing the address conversion necessary for the enlargement and reduction; and 113 denotes a frame memory for storing TV image frames.

For convenience of explanation, it is assumed that the TV camera 101 as the input apparatus inputs a non-interlaced input and the magnification in enlargement and reduction lies within a range from sixteen times to 1/16 times. In this case, data of sixteen lines can be accessed at random into and from the input buffer memories 107 and 108 and the output buffer memories 109 and 110.

The enlargement operation will be first described. An explanation will now be made with regard to the case where the rectangular point $(X_1, Y_1)$ of which $(X_1, Y_1)$ and $(X_2, Y_2)$ of the input image are diagonal was moved to $(X_3, Y_3)$ and enlarged n times. The coordinate values $Y_1$ and $Y_2$ are set into the input interface 102 and the coordinate $Y_3$ is set into the interleave controlling unit 106. Then, $[16/n]$ ([] is a Gaussian symbol) is calculated and set into the interleave controlling unit 103 and start signal generating unit 111. This symbol $[16/n]$ is the expression to determine the raster data of how many lines are input from the input buffer memory 107 or 108 into the output buffer memory 109 or 110. For example, in the case where the original image is doubled, $[16/2]=8$. Therefore, the data of up to eight lines is input. Further, $[16/n]$ n and $(X_2-X_1)$ n+$X_3$ are calculated and the results of these calculations together with $X_3$ are set into the interleave controlling unit 106.

Figure 9:
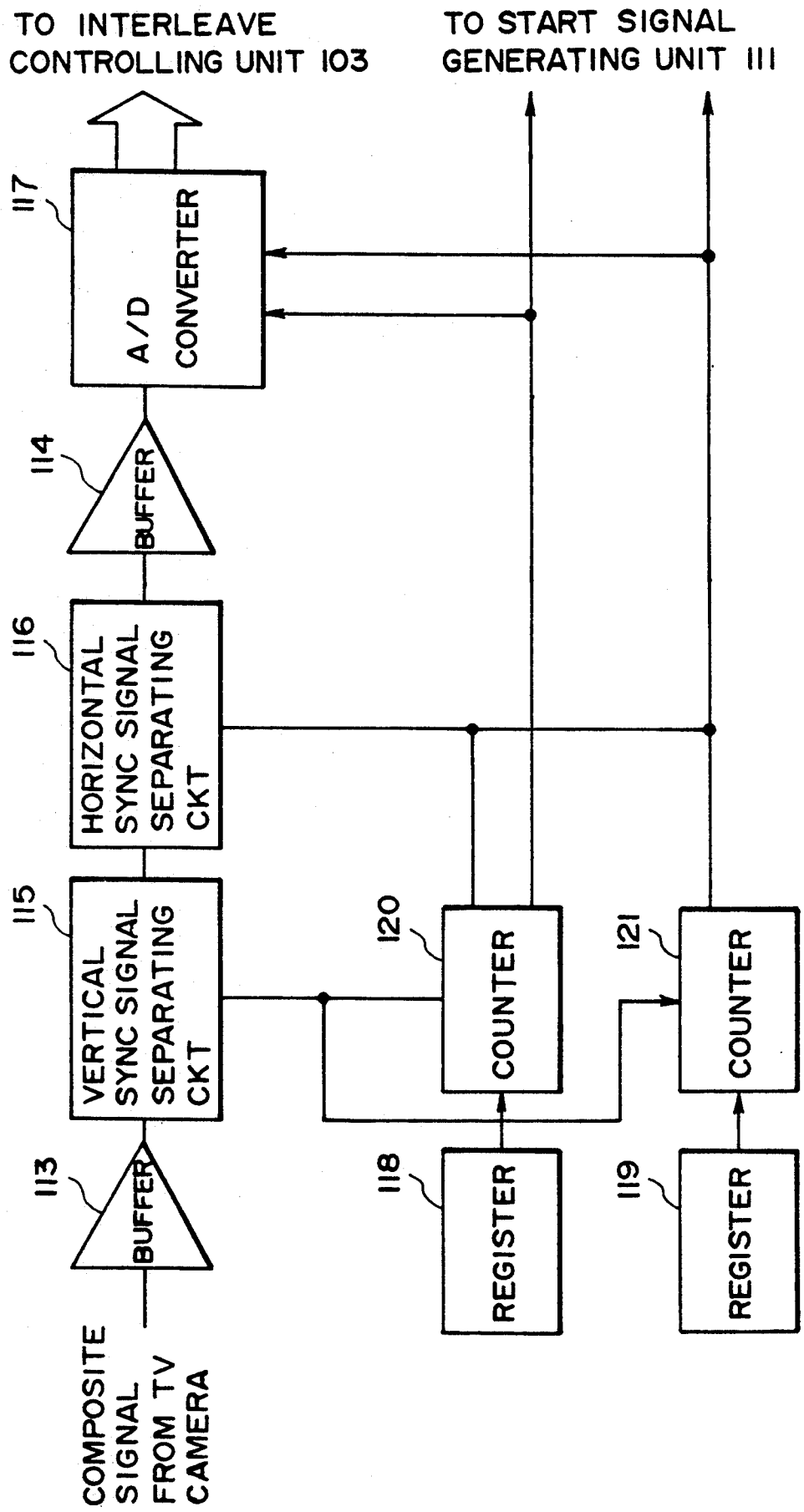
FIG. 9 is a diagram showing an input interface in FIG. 8.

FIG. 9 is a diagram of the input interface 102. Reference numeral 113 and 114 denote analog buffer amplifiers; 115 is a vertical sync signal separating circuit; 116 denotes a horizontal sync signal separating circuit; 117 denotes an A/D converter with an output enable; 118 and 119 denote registers; and 120 and 121 denote counters.

In the input interface 102, $Y_1$ is preset to the register 118 and $Y_2$ is preset to the register 119. When the input interface 102 receives a vertical sync signal from the TV camera 101, it loads the content $Y_1$ of the register 118 into the counter 120 and the content $Y_2$ of the register 119 into the counter 121. Then, the input interface 102 starts the down-counting operation of a horizontal sync signal. Although the image signal is transmitted to the A/D converter 117 through the buffer amplifiers 113 and 114, the A/D converter 117 does not operate until the count value of the counter 120 becomes 0. When the count value of the counter 120 becomes 0, the A/D converter 117 A/D converts the image signal and sends the digital signal to the interleave controlling unit 103. When the count value of the counter 120 becomes 0, on the other hand, this 0 signal is transferred to the start signal generating unit 111. Thereafter, the A/D converter 117 continuously performs the A/D conversion until the count value of the counter 121 becomes 0. The A/D converter 117 stops the A/D conversion when the count value of the counter 121 becomes 0.

The interleave controlling units 103 and 104 perform processes which are substantially similar to the memory interleave for the real-time processes which are ordinarily used. Namely, the interleave controlling unit 103 first sequentially generates the addresses to the input buffer memory 107 and writes the raster data which is supplied from the input interface unit 102. When the data of preset $[16/n]$ lines has been stored, the interleave controlling unit 103 switches the input buffer memory from 107 to 108. At the same time, the interleave controlling unit 104 switches the input buffer memory from 108 to 107 so as to read out the data from the memory 107.

Due to the above operation, the data of the input image from $Y_1$ to $[16/n]$ lines is written into the input buffer memory 107, and the image data from the $(Y_1+[16/n])$ lines is subsequently written into the input buffer memory 108. The interleave controlling unit 104 itself does not generate the read address but merely reads the data of the address which is given from the enlargement/reduction converting unit 112 from the input buffer memory 107 or 108.

After the start signal generating unit 111 receives the signal indicative that the input image had reached $Y_1$ from the input interface 102, the generating unit 111 makes the counter operative to start counting the horizontal sync signal. Each time the horizontal sync signals as many as $[16/n]$ are counted, the generating unit 111 generates a start signal to the enlargement/reduction converting unit 112.

Figure 10:
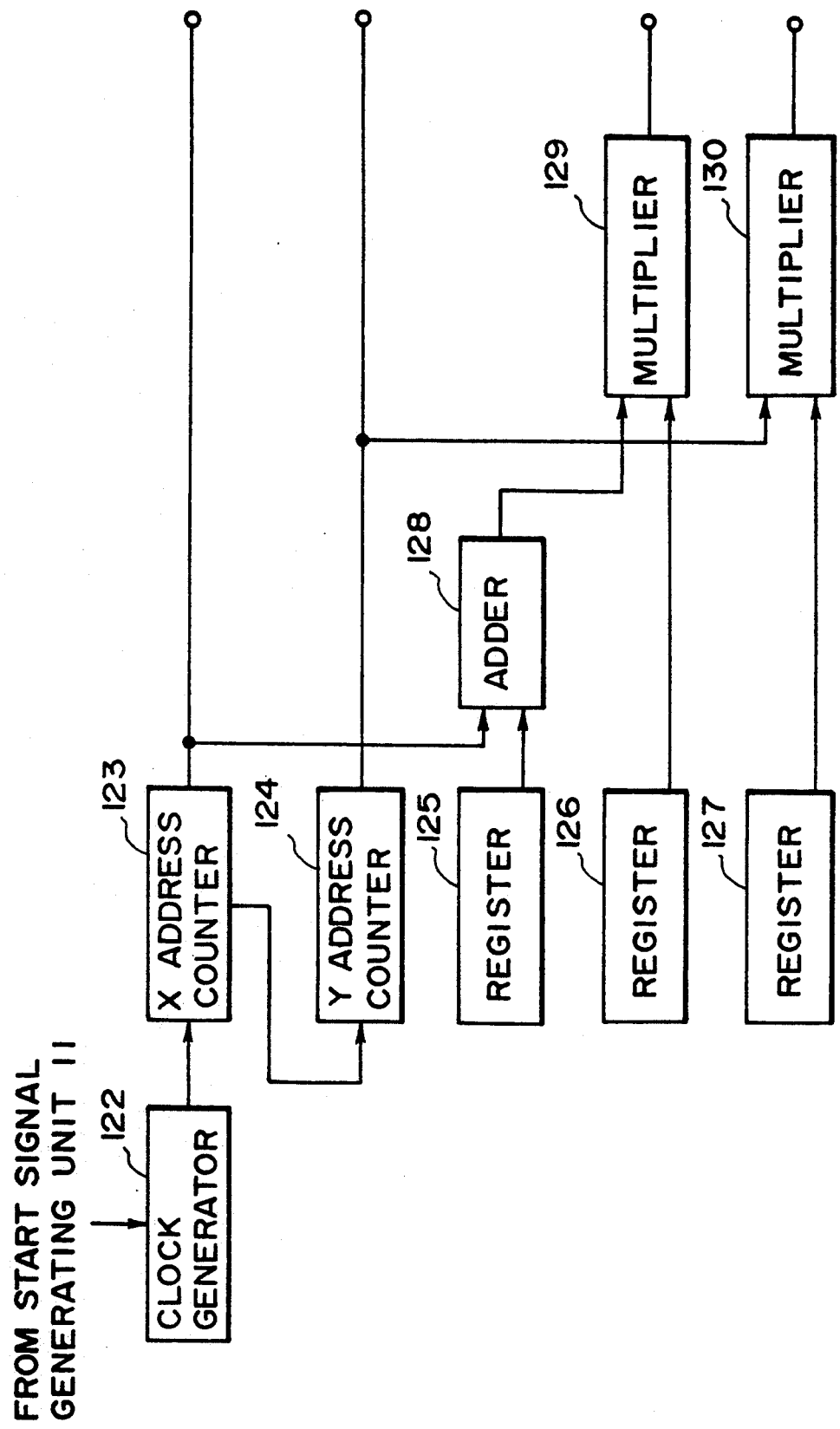
FIG. 10 is a diagram showing an enlargement/reduction converting unit in FIG. 8.

FIG. 10 shows an example of the enlargement/reduction converting unit 112. Reference numeral 122 denotes a clock generator; 123 is an X address counter; 124 denotes a Y address counter; 125 to 127 denote registers; 128 denote an adder; and 129 and 130 denote multipliers.

For the enlargement and parallel movement of the image, assuming that the addresses of the input image to be moved and enlarged are X and Y and the addresses after the processes are X' and Y', $$X' = X \cdot n + t_x$$

$$Y' = Y \cdot n + t_y$$

However, the parallel movement in the Y direction can be expressed such that $$X' = X \cdot n + (X_3 - X_1)$$

$$Y' = Y \cdot n$$

since the reading of the input image is skipped until the movement start point by the input interface 102 and ( the image data is written into the frame memory 113 due to the interleave controlling unit 106. By solving these expressions with respect to X and Y, $$X = \{X' + (X_1 - X_3)\}/n$$
$$Y = Y'/n$$

will be obtained. From the above expressions, $(X_1-X_3)$ is preset to the register 125 and $1/n$ is preset to the registers 126 and 127. When the enlargement/reduction converting unit 112 receives the start signal from the start signal generating unit 111, an image clock is generated from the clock generator 122 and at the same time, the X address counter 123 and Y address counter 124 are reset. Thereafter, the X address counter 123 counts the clocks from the clock generator 122 and generates the X address. After completion of the storage of the data of one line, the count value of the X address counter 123 is returned to 0 and the count value of the Y address counter 124 is increased. Therefore, the converting unit 112 continuously transmits a series of raster addresses to the interleave controlling unit 105 for the period of time from the reception of the start signal until a new start signal is received.

On the other hand, the X address is added to the content $(X_1-X_3)$ of the register 125 by the adder 128. The added output of the adder 128 is multiplied with the content $1/n$ of the register 126 by the multipler 129. The X address before the enlargement corresponding to the raster address after the enlargement is generated in accordance with the foregoing expressions. On the other hand, the Y address is multiplied with the content $1/n$ of the register 127 by the multiplier 130, so that the Y address before the enlargement corresponding to the raster address after the enlargement is generated. The outputs of the multipliers 129 and 130 become the X and Y addresses corresponding to the raster addresses after the enlargement and are transmitted to the interleave controlling unit 104. Therefore, the content of the address which is generated from the enlargement/reduction converting unit 112 to the interleave controlling unit 104 is read out of the input buffer memory 107 or 108, and the read data is written in the address in the output buffer memory 109 or 110 sent to the interleave controlling unit 105 from the converting unit 112. These operations are sequentially repeatedly executed.

The start signal is generated for every [16/n] lines. The data as much as [16/n] lines has been stored in the input buffer memory 107 or 108. Therefore, the overflow of addresses will not occur in the input buffer memory 107 or 108. On the other hand, since the data as much as sixteen lines has been stored in the output buffer memory 109 or 110 as well and the maximum address is up to [16/n]·n, no problem will occur.

When the data has been written into the output buffer memory 109 or 110 due to the above operations, the data which was enlarged by n times in both X and Y directions and moved in parallel by only the distance $(X_3 - X_1)$ in the X direction is written into the memory 109 or 110 by only an amount of [16/n]·n lines.

The input image addresses $X_1$ and $X_2$ correspond to $X_3$ and $(X_2 - X_1) \cdot n + X_3$ in the output buffer memory 109 or 110. Therefore, the interleave controlling unit 106 starts writing the data from $X_3$ to $(X_2 - X_1) \cdot n + X_3$ of the content of the output buffer memory 109 or 110 on the side into which no data is not written due to the interleave controlling unit 105 from $(X_3, Y_3)$ in the frame memory 113 in response to the start signal. However, in the Y direction, the address is increased by only [16/n]·n each time the start signal is received once.

The reducing conversion will now be described. In this case, since the fundamental operation is almost similar to the operation upon enlargement, only the processes different from those upon enlargement will be described. Namely, the start signal is generated for every sixteen lines and the interleave controlling unit 103 switches the input buffer memories 107 and 108 for every sixteen lines as well. Assuming that the addresses after the reduction are (X', X') and the addresses before the reduction are (X, Y), the following expressions concerning the reduction will be derived.

$$X' = X/n + (X_3 - X_1)$$
$$Y' = Y/n$$
By inversely converting the above expressions,
$$X = \{X' + (X_1 - X_3)\} \cdot n$$
$$Y = Y' \cdot n$$

Therefore, it is sufficient to set $(X_1 - X_3)$ to the register 125 and n to the registers 126 and 127 in FIG. 10.

Although the maximum Y address in the input buffer memory 107 or 108 is 116, the maximum Y address in the corresponding output buffer memory 109 or 110 is up to [16/n]. Therefore, it is sufficient that the interleave controlling unit 106 writes the data as much as [16/n] lines in the output buffer memory into the frame memory 113 while increasing the Y address by only [16/n] each time the start signal is received once.

In the description of the embodiment, the magnification of the enlargement and reduction lies within a range from 16 times to 1/16 times; however, the magnification is not limited to this but may be set to an arbitrary value by increasing the capacities of the buffer memories 107 to 110.

The magnifications of the enlargement and reduction in the X and Y directions are not necessarily the same but may be different values by setting different values to the registers 126 and 127 in the converting unit 112. In this case, if the image is enlarged in the X direction and reduced in the Y direction, the reducing and enlarging processes are executed in accordance with the reducing and enlarging methods as described in the embodiment. In addition to the converting unit 112, the movement in the X direction can be also performed until the data is written into the input buffer memory 107 or 108 and until the data is written from the output buffer memory 109 or 110 into the frame memory 113.

As described above, according to the embodiment, each process is executed by hardware, so that the image processes can be performed at a fairly high speed.

On the other hand, the data can be picked up on a rectangular block unit basis for the raster input image. The input buffer of n lines and the output buffer of m lines are provided and the enlargement and reduction conversions are carried out between the input and output buffers. Therefore, the enlargement of m times and the reduction of 1/n times and the parallel movement can be performed. Further, an arbitrary magnification can be set individually in the directions of the X and Y axes. In addition, since the input buffer address corresponding to the output buffer address is obtained, there is no need to consider the lack of pixels. Further, the real-time processes can be performed due to two input buffer memories of n lines and two output buffer memories of m lines.

As described above, according to the second embodiment, since each process is performed by hardware, the image can be processed at a fairly high speed.

On the other hand, the raster input image can be picked up on a rectangular block unit basis. The input buffer memory of n lines and the output buffer memory of m lines are provided. Thus, the enlargement of m times and the reduction of 1/n times and the parallel movement can be executed. Moreover, the magnification degree can be individually set in the directions of the X and Y axes. Also, since the input buffer address corresponding to the output buffer address is obtained, there is no need to consider the lack of pixels. The real-time processes can be executed due to two input buffer memories of n lines and two output buffer memories of m lines.

As mentioned above in the first and second embodiments, according to the present invention, in coordinate converting processes, the processes can be executed at a high speed and the memory capacity can be reduced.

The present invention is not limited to the foregoing embodiments but many modifications and variations are possible within the spirit and scope of the appended claims of the invention.

What is claimed is:

1. An image processing apparatus comprising:
    generating means for generating a plurality of sets of image data representing an original image;
    first memory means for sequentially storing the plurality of sets of image data representing a plurality of portions of the original image obtained by dividing the original image into a plurality of portions;
    first processing means for sequentially processing the plurality of sets of image data sequentially stored in said first memory means to rotate the plurality of portions of the original image represented by the plurality of sets of image data;

second memory means for sequentially storing the plurality of sets of image data sequentially processed by said first processing means and representing the plurality of portions of the original image; and second processing means for sequentially processing the plurality of sets of image data sequentially stored in said second memory means so that an image reproduced from the sequentially processed plurality of sets of image data is moved parallel to be rotated with respect to a point different from an origin of a coordinate system for the original image.

2. An apparatus according to claim 1, wherein said first and second processing means execute processing operations in accordance with a rotation angle of the original image.

3. An apparatus according to claim 2, further comprising input means for inputting the rotation angle of the original image.

4. An apparatus according to claim 1, wherein said first processing means comprises first calculating means for calculating a rotation amount of the plurality of portions of the original image represented by the plurality of sets of image data, and wherein said second processing means comprises second calculating means for calculating an amount of parallel movement of the plurality of portions of the original image represented by the plurality of sets of image data.

5. An apparatus according to claim 1, further comprising image data storing means for storing the plurality of sets of image data sequentially processed by said second processing means and representing the plurality of portions of the original image.

6. An apparatus according to claim 1, wherein said first processing means executes a processing operation to rotate the plurality of portions of the original image represented by the plurality of sets of image data using a center of each of the plurality of portions of the original image as a rotational axis.

7. An apparatus according to claim 1, wherein said first memory means sequentially stores the plurality of sets of image data representing the plurality of portions of the original image, the plurality of portions of the original image being obtained by dividing the original image in a partial-overlapping manner.

8. An apparatus according to claim 1, wherein the capacity of said first memory means is equal to or smaller than the capacity of said second memory means.

9. An apparatus according to claim 1, wherein said first and second memory means respectively comprise a pair of memory units, said pair of memory units alternately storing the plurality of sets of image data.

10. An image processing apparatus comprising:
generating means for generating, line by line, a plurality of sets of image data representing a plurality of lines of an original image;

first memory means for sequentially storing the plurality of sets of the image data representing the plurality of lines of the original image;

first processing means for sequentially processing the plurality of sets of image data sequentially stored in said first memory means to vary the magnification of the original image;

second memory means for sequentially storing the plurality of sets of the image data representing the plurality of lines of the original image and sequentially processed by said first processing means; and second processing means for sequentially processing the plurality of sets of the magnification-varied image data sequentially stored in said second memory means so that an image reproduced from the sequentially processed plurality of sets of image data is moved parallel to vary the magnification of the original image.

11. An apparatus according to claim 10, wherein said first memory means stores the plurality of sets of the image data representing a portion of the original image.

12. An apparatus according to claim 10, wherein said first processing means executes a processing operation in accordance with a desired magnification rate.

13. An apparatus according to claim 12, further comprising input means for inputting the magnification rate.

14. An apparatus according to claim 10, wherein said first and second memory means respectively comprises a pair of memory units, said pair of memory units alternately storing the plurality of sets of image data representing to the plurality of lines of the original image.

15. An apparatus according to claim 10, wherein said second processing means executes a processing operation on the plurality of sets of the image data stored in said second memory means, so that the reproduced image is moved to a desired position.

16. An image processing apparatus comprising:
generating means for generating a plurality of sets of image data representing an original image;

first memory means for sequentially storing the plurality of sets of image data representing a plurality of portions of the original image obtained by dividing the original image into a plurality of portions;

first processing means for sequentially processing the plurality of sets of image data sequentially stored in said first memory means to rotate the plurality of portions of the original image represented by the plurality of sets of image data;

second memory means for sequentially storing the plurality of sets of image data sequentially processed by said first processing means and representing the plurality of portions of the original image;

means for designating a point to be a rotation axis; and second processing means for sequentially processing the plurality of sets of image data sequentially stored in said second memory means so that an image reproduced from the sequentially processed plurality of sets of image data is rotated and moved in parallel with respect to the point designated by said designating means.

* * * * *

UNITED STATES PATENT AND TRADEMARK OFFICE
CERTIFICATE OF CORRECTION

PATENT NO. : 5,263,135            Page 1 of 2

DATED : November 16, 1993

INVENTOR(S) : KATSUHITO DEI

It is certified that error appears in the above-indentified patent and that said Letters Patent is hereby corrected as shown below: Title page,

[56] REFERENCES CITED
     Insert --4,929,085 5/1990 Kajihara--.

Title page, item
[57] ABSTRACT
     Line 4, "includes" should read --includes:--.

SHEET 7 OF THE DRAWINGS
     In Fig. 8, "MAMORY" in box 113 should read --MEMORY--.

SHEET 9 OF THE DRAWINGS
     In Fig. 10, "INTERLEVE" should read --INTERLEAVE--.

COLUMN 1
     Line 63, "the" should read --a--.
     Line 64, "a" should be deleted.

COLUMN 2
     Line 28, "the" should be deleted.
     Line 53, "of," should read --of--.

COLUMN 3
     Line 18, "into" should read --in--.
     Line 62, "angle 8" should read --angle $\theta$--.

COLUMN 4
     Line 13, "block," should read --block 21--.
     Line 14, "he" should read --the--.
     Line 21, "rotations" should read --rotation--.

COLUMN 5
     Line 6, "1/2is" should read --1/2 is"--.
     Line 8, "1/2which" should read --1/2 which--.

UNITED STATES PATENT AND TRADEMARK OFFICE
CERTIFICATE OF CORRECTION

PATENT NO. : 5,263,135   Page 2 of 2
DATED : November 16, 1993
INVENTOR(S) : KATSUHITO DEI It is certified that error appears in the above-indentified patent and that said Letters Patent is hereby corrected as shown below:

<u>COLUMN 8</u>
    Line 54 --"111 denote" should read --111 denotes--.

<u>COLUMN 9</u>
    Line 8, "(□ is" should read --( [] is --.

<u>COLUMN 10</u>
    Line 13, "128 denote" should read --128 denotes--.
    Line 31, "(" should be deleted.

<u>COLUMN 11</u>
    Line 30, Q: "no data is not written" should read --no data is written--.
    Line 43, Q: "(X', X')" should read --(X', Y')--.

Signed and Sealed this

Ninth Day of August, 1994

BRUCE LEHMAN

*Attest:*

*Attesting Officer*           *Commissioner of Patents and Trademarks*